United States Patent [19]

Yasuhara

[11] Patent Number: 4,542,725
[45] Date of Patent: Sep. 24, 1985

[54] FUEL INJECTION RATE CONTROL SYSTEM FOR AN INTERNAL COMBUSTION ENGINE

[75] Inventor: Seishi Yasuhara, Yokosuka, Japan
[73] Assignee: Nissan Motor Company, Limited, Japan
[21] Appl. No.: 636,413
[22] Filed: Jul. 31, 1984
[30] Foreign Application Priority Data
  Aug. 17, 1983 [JP] Japan .................. 58-149143
[51] Int. Cl.⁴ .......................................... F02M 41/00
[52] U.S. Cl. ..................... 123/299; 123/449
[58] Field of Search ............... 123/299, 300, 449, 458, 123/179 L

[56] References Cited

U.S. PATENT DOCUMENTS

| | | | |
|---|---|---|---|
| 3,575,146 | 4/1971 | Creighton | 123/299 |
| 4,033,314 | 7/1977 | Walton | 123/299 |
| 4,083,345 | 4/1978 | Davis | 123/179 L |
| 4,273,087 | 6/1981 | Goloff | 123/299 |
| 4,295,449 | 10/1981 | Cemenska et al. | 123/300 |
| 4,310,291 | 1/1982 | Green et al. | 123/179 L |
| 4,392,466 | 7/1983 | Mowbray et al. | 123/179 L |
| 4,414,940 | 11/1983 | Loyd | 123/299 |

FOREIGN PATENT DOCUMENTS

| | | | |
|---|---|---|---|
| 0065857 | 4/1982 | Japan | 123/458 |
| WO81/00617 | 11/1982 | PCT Int'l Appl. | 123/299 |

*Primary Examiner*—Ira S. Lazarus
*Assistant Examiner*—David A. Okonsky
*Attorney, Agent, or Firm*—Leydig, Voit & Mayer, Ltd.

[57] ABSTRACT

A first pump serves to periodically inject fuel into a combustion chamber of an internal combustion engine at a first timing in terms of crankshaft rotation, i.e., crank angle. A second pump serves to periodically inject fuel into the combustion engine at the first timing and also at a second timing in terms of crank angle. The second timing precedes the first timing. The rate of fuel injection by the second pump at the first timing is inversely related to the rate of fuel injection by the second pump at the second timing.

12 Claims, 17 Drawing Figures

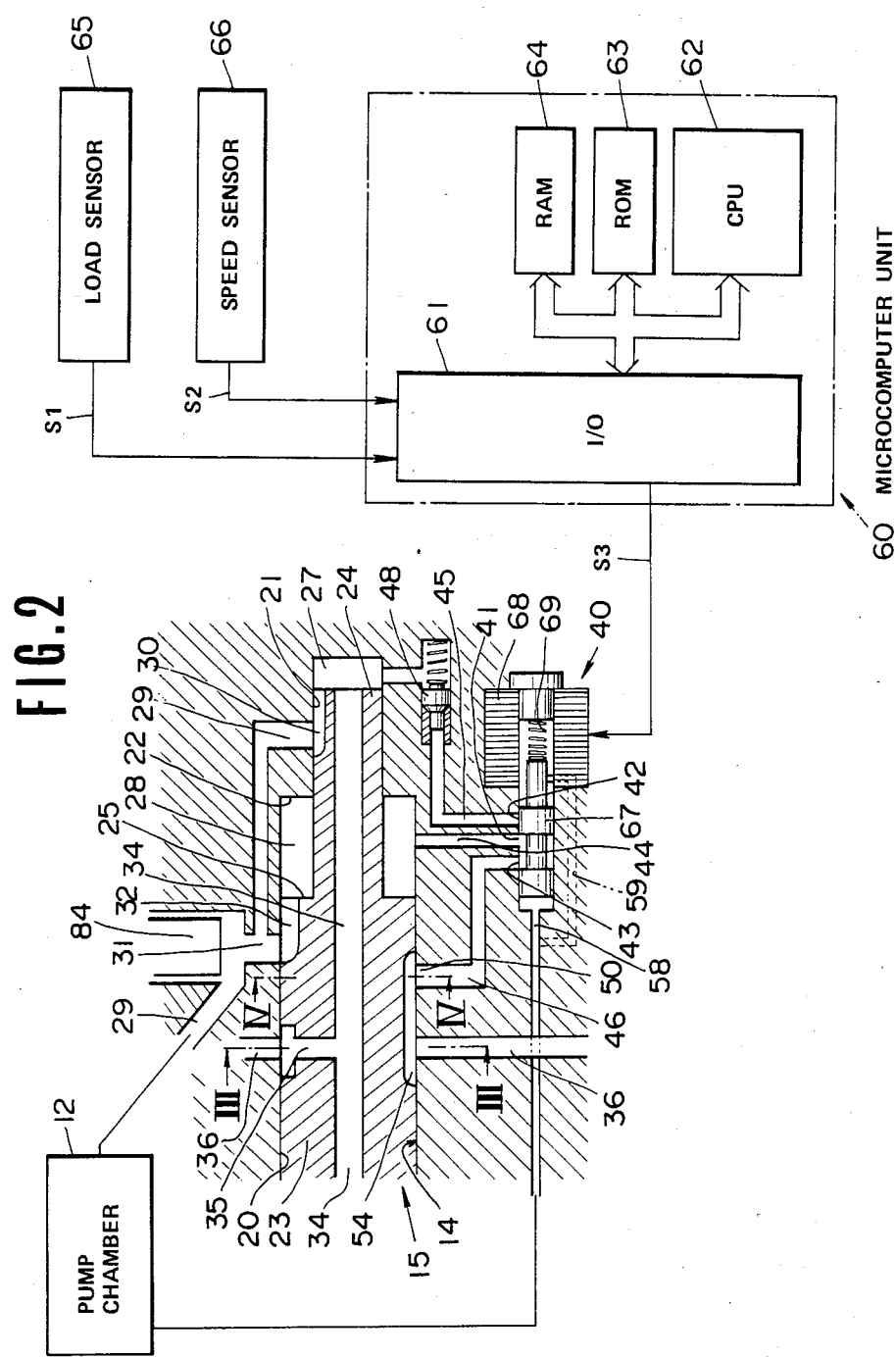

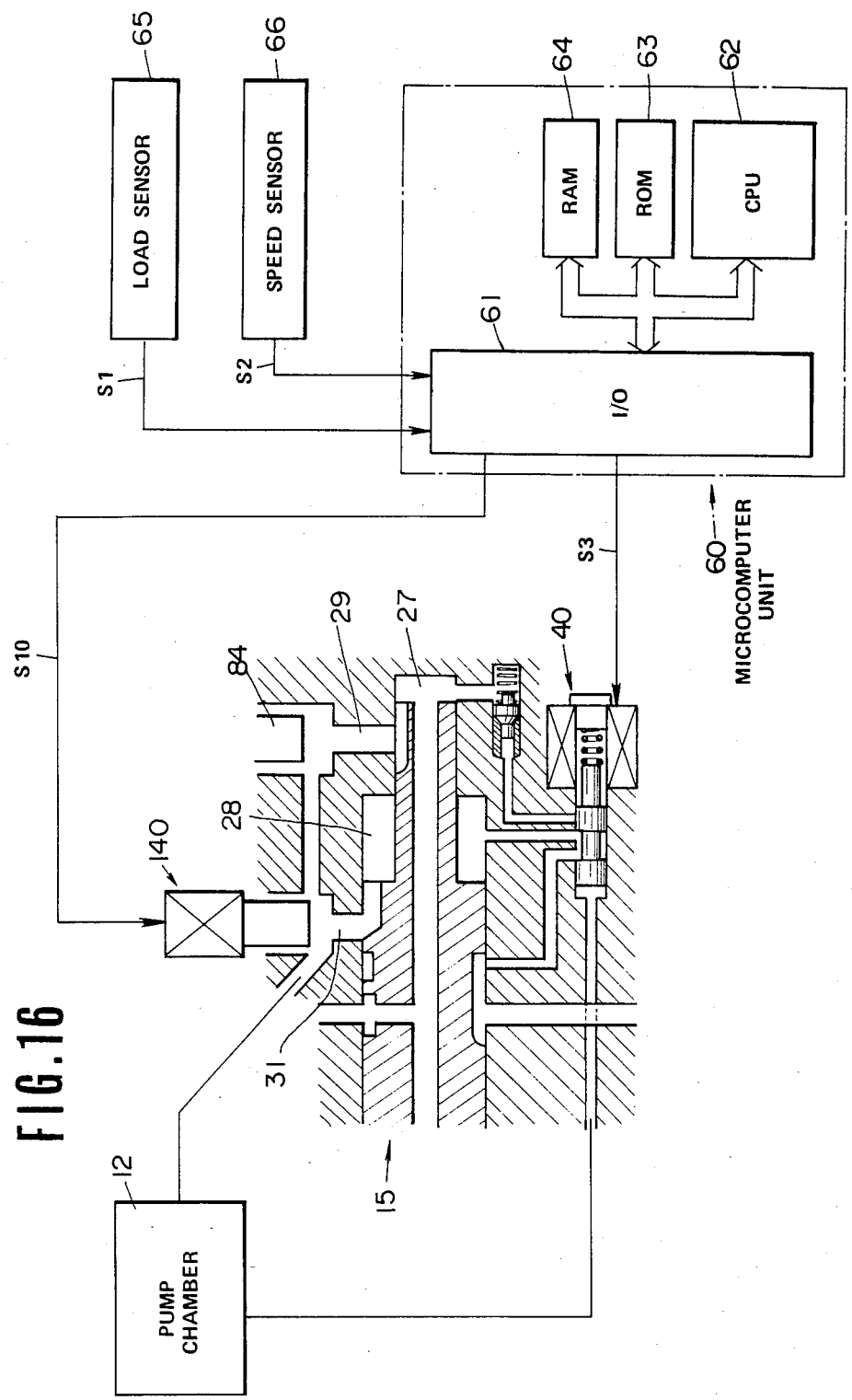

4,542,725

FUEL INJECTION RATE CONTROL SYSTEM FOR AN INTERNAL COMBUSTION ENGINE

BACKGROUND OF THE INVENTION

This invention relates to a fuel injection rate control system for an internal combustion engine, such as a diesel engine.

In diesel engines, fuel is periodically injected into engine combustion chambers by means of fuel injection systems. Diesel engines are susceptible to noisy combustion or detonation. This results from ignition lag which causes supply of an excessive quantity of fuel to combustion chambers before ignition begins. To overcome this problem, some conventional fuel injection systems provide pilot fuel charges in advance of main fuel charges. The pilot injection expedites the commencement of ignition of the main charge of fuel, thereby preventing accumulation of an excessive quantity of fuel prior to the commencement of ignition.

In automotive diesel engines, under small engine loads pilot fuel injection and moderate fuel injection rates are actually desirable to prevent noisy combustion and detonation. Under heavy engine loads, pilot fuel injection is unnecessary but high fuel injection rates are necessary in order to achieve adequately high engine power output.

Japanese patent publication No. 57-65857 discloses a fuel injection system providing pilot charges. In this system, pilot fuel injection quantity and rate can be adjusted as a function of engine load. Reductions in the pilot quantity and rate entail concomitant decreases in main fuel injection quantity and rate. Furthermore, it is impossible to completely interrupt the pilot injections in this conventional system. Accordingly, this system does not acceptably meet the injection characteristic requirements described above.

SUMMARY OF THE INVENTION

It is an object of this invention to provide a fuel injection rate control system for an internal combustion engine which selectively achieves high engine power output and prevents noisy combustion and detonation.

In accordance with this invention, a fuel injection rate control system includes first and second pump means. The first pump means serves to periodically inject fuel into a combustion chamber of an internal combustion engine at a first timing with respect to the angular position of the crankshaft of the engine. The second pump means serves to periodically inject fuel into the combustion chamber at the first timing and also at a second timing with respect to crankshaft angle. The second timing precedes the first timing. The rate of fuel injection by the second pump means at the first timing is inversely related to the rate of ful injection by the second pump means at a second timing.

BRIEF DESCRIPTION OF THE DRAWINGS

FIG. 2 is a diagram of the fuel injection rate control system of the first embodiment.

FIG. 16 is a diagram of a sixth embodiment of this invention.

Like and corresponding elements are denoted by the same reference numerals throughout the drawings.

DESCRIPTION OF THE PREFERRED EMBODIMENTS

Figure 1:
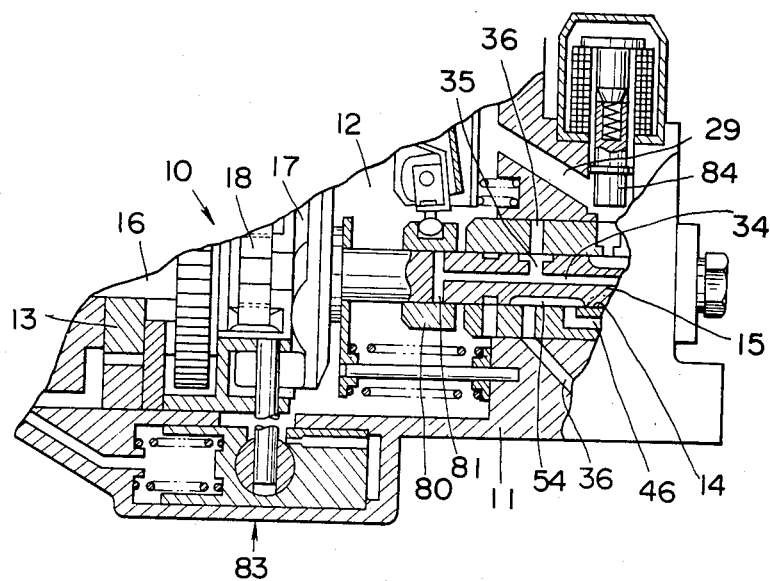
FIG. 1 is a cross-sectional view of a portion of a fuel injection pump used in a fuel injection rate control system according to a first embodiment of this invention.

With reference to FIG. 1, a fuel injection pump 10 has a housing 11 within which a pump chamber 12 is formed. A fuel feed pump 13 disposed within the housing 11 drives fuel into the pump chamber 12 by way of a pressure control valve (not shown).

The housing 11 defines a blind bore 14 extending from the pump chamber 12. A plunger 15 slideably extends into the bore 14. This plunger 15 is connected to a rotatable drive shaft 16 via a cam mechanism 17 and a key coupling 18. The drive shaft 16 is coupled to the crankshaft of a diesel engine (not shown) so that it is rotated by the engine. The cam mechanism 17 and the key coupling 18 are designed such that rotation of the drive shaft 16 causes the plunger 15 to rotate and to axially reciprocate.

As shown in FIG. 2, the bore 14 is stepped and thus has a large-diameter portion 20 and a small-diameter portion 21. The housing 11 defines a shoulder 22 between these portions 20 and 21. The large-diameter portion 20 extends from the entrance of the bore 14 to the shoulder 22. The small-diameter portion 21 extends from the shoulder 22 to the blind end of the bore 14.

The plunger 15 is also stepped and has a large-diameter portion 23 and a small-diameter portion 24. The plunger 15 defines a shoulder 25 between these portions 23 and 24. The large-diameter portion 23 of plunger 15 fits snugly into the large-diameter bore 20. The plunger shoulder 25 resides wholly within the large-diameter bore 20. The small-diameter portion 24 of plunger 15 extends into the small-diameter bore 21. This plunger portion 24 fits snugly in the small-diameter bore 21.

The region between the blind end of the bore 14 and the end face of the plunger 15 constitutes a first pressure or pumping chamber 27. The region between the shoulders 22 and 25 constitutes a second pressure or pumping chamber 28. This pressure chamber 28 is annular. As the plunger 15 moves in an axial direction, the pressure chambers 27 and 28 contract. As the plunger 15 moves in the opposite axial direction, the pressure chambers 27 and 28 expand.

The walls of the housing 11 define a first fuel intake passage 29 extending between the pump chamber 12 and the small bore 21. The end of the plunger 15 within the small bore 21 has axial grooves 30, only one of which is shown in FIG. 2. The number of grooves 30 is equal to the number of engine combustion chambers (not shown). The grooves 30 are spaced at equal angular intervals. The grooves 30 open into the first pressure chamber 27. As the plunger 15 rotates, the end of the first fuel intake passage 29 moves into and out of the register or communication with each of the grooves 30 sequentially or in turn. As the plunger 15 moves through its expansion stroke, the communication between the first fuel intake passage 29 and one of the grooves 30 is maintained. Therefore, as the first pressure chamber 27 expands, fuel is drawn from the pump chamber 12 into the first pressure chamber 27 via the first fuel intake passage 29 and one of the grooves 30.

The walls of the housing 11 define a second fuel intake passage 31 extending between an intermediate section of the first fuel intake passage 29 and the large bore 20. The large portion 23 of plunger 15 has axial grooves 32 near the shoulder 25, only one of which is shown in FIGS. 1 and 2. The number of grooves 32 is equal to the number of engine combustion chambers. The grooves 32 are spaced at equal angular intervals. The grooves 32 open into the second pressure chamber 28. As the plunger 15 rotates, the end of the second fuel intake passage 31 moves into and out of register or communication with each of the grooves 32 sequentially or in turn. Communication beteen the second fuel intake passage 31 and the second pressure chamber 28 is maintained throughout the expansion stroke of the plunger 15. Therefore, as the second pressure chamber 28 expands, fuel is drawn from the pump chamber 12 into the second pressure chamber 28.

Expansion of the first pressure chamber 27 and expansion of the second pressure chamber 28 are caused by the same axial movement of the plunger 15, so that fuel supply to the first pressure chamber 27 and fuel supply to the second pressure chamber 28 are synchronous and simultaneous with one another. Fuel intake stroke is defined as movement of the plunger 15 causing expansion of the pressure chambers 27 and 28, that is, fuel supply to these pressure chambers 27 and 28.

Figure 3:
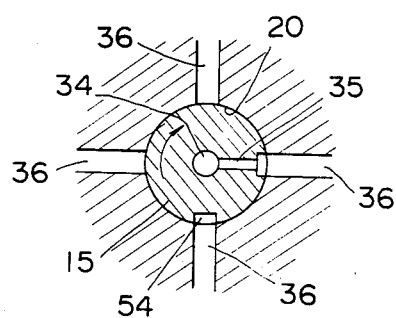
FIG. 3 is a cross-sectional view taken along the line III—III of FIG. 2.

The plunger 15 has an axial passage 34 extending from the first pressure chamber 27. A radial fuel-distribution passage 35 is formed in the large portion 23 of plunger 15. The inner end of the radial passage 35 is connected to the axial passage 34. The outer end of the radial passage 35 opens onto the periphery of the large portion 23 of plunger 15. As best shown in FIG. 3, the walls of the housing 11 define a set of fuel discharge passages 36 each of which extends between the large bore 20 and the outer surface of the housing 11. The inner ends of the fuel discharge passages 36 extend radially with respect to the plunger 15 and are spaced at equal angular intervals. The number of fuel discharge passages 36 is equal to the number of engine combustion chambers. As the plunger 15 rotates, the fuel-distribution passage 35 moves into and out of register or communication with each of the fuel discharge passages 36 sequentially or in turn. Communication between the radial passage 35 and one of the fuel discharge passages 36 continues throughout the compression stroke of plunger 15. During this period, the communication between the first fuel intake passage 29 and the grooves 30 remains blocked. Therefore, as the plunger 15 moves through its compression stroke, fuel can be driven out of the first pressure chamber 27 into one of the fuel discharge passages 36 via the axial passage 34 and the fuel-distribution passage 35. The fuel discharge passages 36 are connected to corresponding fuel injection nozzles (not shown). These injection nozzles project into corresponding engine combustion chambers to inject fuel into the combustion chambers. A delivery or check valve is disposed in each of the fuel discharge passages 36. After passing through the fuel discharge passages 36, fuel is transmitted to the injection nozzles via the check valves and is then injected into the combustion chambers.

Figure 4:
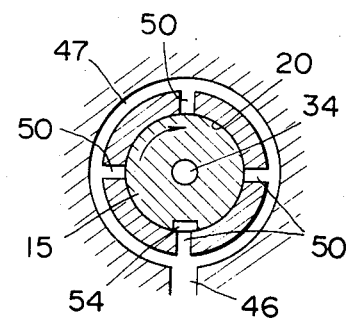
FIG. 4 is a cross-sectional view taken along the line IV—IV of FIG. 2.

An electromagnetic three-way spool valve 40 supported by the housing 11 has an inlet 41 and two outlets 42 and 43. The inlet 41 is connected to the second pressure chamber 28 via a first fuel supply passage 44 formed in the wall of the housing 11. The first outlet 42 is connected to the first pressure chamber 27 via a second fuel supply passage 45 formed in the walls of the housing 11. A check valve 48 disposed in the second fuel supply passage 45 allows fluid flow only in the direction from the first outlet 42 to first pressure chamber 27. One end of the pilot fuel passage 46 formed in the walls of the housing 11 is connected to the second outlet 43. As best shown in FIG. 4, an annular passage 47 defined in the walls of the housing 11 concentrically encircles the large bore 20. The other end of the pilot fuel passage 46 is connected to this annular passage 47. The walls of the housing 11 define a set of radial passages 50 each of which extends between the annular passage 47 and the large bore 20. The number of radial passages 50 is equal to the number of engine combustion chambers. The radial passages 50 are spaced at equal angular intervals. As best shown in FIG. 2, the large-diameter portion 23 of plunger 15 has an axial groove 54. As the plunger 15 rotates, this axial groove 54 moves into and out of register or communication with each of the fuel discharge passages 36 sequentially or in turn. As the plunger 15 rotates, the axial groove 54 also moves into and out of register or communication with each of the radial passages 50 sequentially or in turn as is understood from FIG. 4. As shown in FIGS. 3 and 4, the angular positions of the inner ends of the fuel discharge passages 36 match the angular positions of the radial passages 50, so that the communication between the axial groove 54 and the fuel discharge passages 36 is simultaneous and synchronous with the communication between the axial groove 54 and the radial passages 50. As shown in FIG. 3, the angular position of the axial groove 54 precedes the angular position of the radial passage 35 by the same angular interval as between the inner ends of the fuel discharge passages 36 in the direction of rotation of the plunger 15 indicated by the arrow. Therefore, when the radial passage 35 communicates with one of the fuel discharge passages 36, the axial groove 54 communicates with the preceding fuel discharge passage. Communication between the axial groove 54, one of the radial passages 50, and one of the fuel discharge passages 36 is established during the compression stroke of the plunger 15.

The three-way valve 40 controllably connects the inlet 41 to the first outlet 42 and the second outlet 43. Specifically, the position of the three-way valve 40 is continuously variable between first and second limit positions. In the first limit position, the three-way valve 40 fully connects the inlet 41 to the first outlet 42 and completely disconnects the inlet 41 from the second outlet 43. In the second limit position, the three-way valve 40 fully connects the inlet 41 to the second outlet 43 and completely disconnects the inlet 41 from the first outlet 42. As the three-way valve 40 is displaced from the first limit position toward the second limit position, the degree of connection between the inlet 41 and the first outlet 42 continuously decreases as the degree of connection between the inlet 41 and the second outlet 43 continuously increases.

In the case where the three-way valve 40 is in its first limit position, that is, where the three-way valve 40 fully connects the inlet 41 to the first outlet 42 and completely disconnects the inlet 41 from the second outlet 43, as the plunger 15 moves through its compression stroke, fuel is formed out of the second pressure chamber 28 into the first fuel supply passage 44 and is then directed into the first pressure chamber 27 by way of the inlet 41, the three-way valve 40, the first outlet 42, the second fuel supply passage 45, and the check valve 48. Contraction of the first pressure chamber 27 is synchronous and simultaneous with contraction of the second pressure chamber 28, so that fuel having entered the first pressure chamber 28 from the second fuel supply passage 45 is forced out of the first pressure chamber 28 into one of the fuel discharge passages 36 via the axial passage 34 and the radial passage 35 together with fuel having entered the first pressure chamber 27 from one of the grooves 30. In this way, the fuel from both the first and second pressure chambers 27 and 28 is injected simultaneously into a common engine combustion chamber, so that a relatively high rate of fuel injection and a large total fuel injection quantity are realized.

In the case where the three-way valve 40 is in its second limit position, that is, where the three-way valve 40 fully connects the inlet 41 to the second outlet 43 and completely disconnects the inlet 41 from the first outlet 42, as the plunger 15 moves through its compression stroke, fuel is forced out of the second pressure chamber 28 into the first fuel supply passage 44 and is then directed into one of the fuel discharge passages 36 by way of the inlet 41, the three-way valve 40, the second outlet 43, the pilot fuel passage 46, the annular passage 47, one of the radial passages 50, and the axial groove 54. After having travelled through one of the fuel discharge passages 36, the fuel is injected into an engine combustion chamber. At this stage, the fuel injection resulting from contraction of the first pressure chamber 27 is directed to a different engine combustion chamber. The engine combustion chamber subjected to the fuel injection resulting from contraction of the second pressure chamber 28 will receive the fuel injection resulting from the next contraction of the first pressure chamber 27. This occurs because when the radial passage 35 communicates with one of the fuel discharge passages 36, the axial groove 54 communicates with the preceding fuel discharge passage as viewed in the direction of rotation of the plunger 15. In this way, for each engine combustion chamber, contraction of the second pressure chamber 28 provides pilot fuel injection prior to main fuel injection caused by contraction of the first pressure chamber 27. The interval in crank angle between pilot and main fuel injections directly corresponds to the angular separations between the fuel discharge passages 36. In the case where the engine has four combustion chambers and the plunger 15 is rotated at half the speed of rotation of the engine crankshaft, this interval is 180° of crankshaft rotation. The pilot fuel injection results in lower main fuel injection rates and quantities in comparison with the case where the three-way valve 40 is in its first limit position at which the second pressure chamber 28 provides part of the main fuel injection. The ratio of the pilot fuel injection quantity to the main fuel injection quantity is preferably 6 to 7.

In the case where the three-way valve 40 is in a position between the first and second limits, that is, where the three-way valve 40 connects the inlet 41 partially to the first inlet 42 and to the second inlet 43, as the plunger 15 moves through its compression stroke, fuel is forced out of the second pressure chamber 28 into the inlet 41 via the first fuel supply passage 44. The three-way valve 40 directs a first portion of this fuel from the inlet 41 into the first outlet 42 and the remainder of the fuel into the second outlet 43. The first portion of fuel passes from the first outlet 42 into the first pressure chamber 27 along the second fuel supply passage 45, finally forming part of the main fuel injection as in the case where the three-way valve 40 is in its first limit position. The remainder of the fuel passes from the second outlet 42 into one of the fuel discharge passages 36 via the pilot fuel passage 46, the annular passage 47, one of the radial passages 50, and the axial groove 54, finally providing pilot fuel injection in a way similar to the case where the three-way valve 40 is in its second limit position. As the position of the three-way valve 40 approaches the second limit position, pilot fuel injection quantity and rate increase but main fuel injection quantity and rate decrease. The check valve 48 prevents fuel flow from the first pressure chamber 27 toward the first outlet 42.

As shown in FIG. 1, a control sleeve 80 disposed in the pump chamber 12 is coaxially mounted on the plunger 15. Te control sleeve 80 is free to slide axially along the plunger 15. A cut-off port 81 extends diametrically through the plunger 15. The axial passage 34 opens into this cut-off port 81. As the plunger 15 moves through its compression stroke, the cut-off port 81 is blocked by the control sleeve 80 at first and is then exposed by the control sleeve 80 to the pump chamber 12. The blockage of the cut-off port 81 enables main fuel injection. Upon exposure of the cut-off port 81 to the pump chamber 12, fuel returns from the first pressure chamber 27 to the pump chamber 12 via the axial passage 34 and the cut-off port 81, thereby disabling or interrupting main fuel injection. The axial position of the control sleeve 80 relative to the plunger 15 determines the effective stroke of main fuel injection and thus the total main fuel injection quantity for each injection stroke. The control sleeve 80 is linked to a manually-actuatable accelerator level (not shown) and a speed governor (not shown), so that the axial position of the control sleeve 80 and the main fuel injection quantity can be adjusted via the accelerator lever and the governor.

A fuel injection timing adjusting device or timer piston 83 disposed within the housing 11 is connected to the camn mechanism 17 to adjust the timing of both the main fuel injection and the pilot fuel injection with respect to the angular position of the engine crankshaft, that is, the crank angle.

As shown in FIGS. 1 and 2, a fuel cut-off valve 84 selectively blocks and opens the first fuel intake passage 29 at a point upstream of the connection with the second fuel intake passage 31. When this valve 84 opens the first fuel intake passage 29, the fuel supply to the first and second pressure chambers 27 and 28 is enabled. When the valve 84 blocks the first fuel intake passage 29, the fuel supply to the first and second pressure chambers 27 and 28 is suspended so that the engine is not provided with any fuel injection. This fuel cut-off forces the engine to stop. Accordingly, when the engine must be stopped, the fuel cut-off valve 84 is closed. Naturally, this valve 84 is normally open.

As shown in FIG. 2, a digital microcomputer unit 60 includes an input/output (I/O) circuit 61, a central processing unit (CPU) 62, a read-only memory (ROM) 63, and a random-access memory (RAM) 64, all mutually interconnected. An engine load sensor 65 monitors the load on the engine and generates a signal S1 representative thereof. An engine speed sensor 66 monitors the rotational speed of the engine and generates a signal S2 representative thereof. Specifically, the rotational speed of the engine crankshaft or camshaft is monitored by this speed sensor 66. The I/O circuit 61 is connected to these sensors 65 and 66 to receive the engine load signal S1 and the engine speed signal S2. On the basis of these signals S1 and S2, the microcomputer unit 60 generates a control signal S3 designed for positional control of the three-way valve 40.

The three-way valve 40 includes a valve spool 67, a linear solenoid 68 for adjusting the position of the valve spool 67, and a return spring 69 for urging the valve spool 67. When any electrical current does not pass through the solenoid 68, the valve spool 67 is held by the spring 69 in a position corresponding to the second limit position of the three-way valve 40. As an electrical current passing through the solenoid 68 increases to a preset maximum, the valve spool 67 is displaced against the force of the spring 69 to another position corresponding to the first limit position of the three-way valve 40. A passage 58 formed in the walls of the housing 11 extends between the pump chamber 12 and a valve end chamber partially defined by one end of the valve spool 67 to equalize the pressure in this valve end chamber and the pressure in the pump chamber 12. Another passage 59 formed in the walls of the housing 11 extends between the pump chamber 12 and another valve end chamber partially defined by the opposite end of the valve spool 67 to equalize the pressure in this valve end chamber and the pressure in the pump chamber 12. In this way, no fluid pressure is exerted across the valve spool 67. This ensures smooth and accurate movement of the valve spool 67. The solenoid 68 is connected to the I/O circuit 61 to receive the control signal S3 having a variable current.

Figure 5:
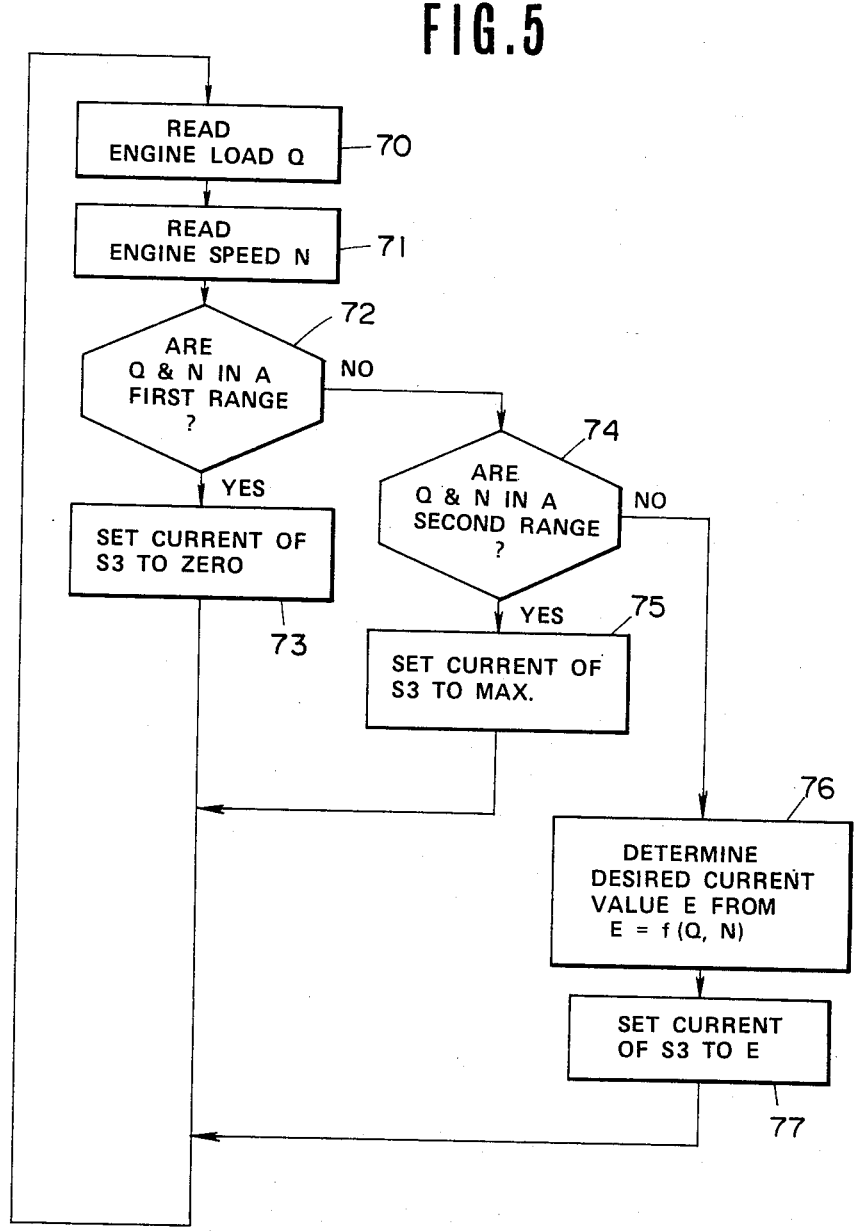
FIG. 5 is a flowchart of a program executed by the microcomputer unit of FIG. 2.

The microcomputer unit 60 operates in accordance with a program in the ROM 63. FIG. 5 is a flowchart of this program. In a first step 70 of this flowchart, the unit 60 derives the current value of engine load from the signal S1. In the flowchart, a variable Q represents this engine load value. In a step 71 subsequent to the first step 70, the unit 60 derives the current value of engine speed from the signal S2. In the flowchart, a variable N represents this engine speed value. After the step 71, the program advances to a step 72.

In the step 72, the unit 60 determines whether or not the engine load value Q and the engine speed value N are within a first range corresponding to low engine speeds and small engine loads. If the engine load value Q and the engine speed value N are within the first range, the program proceeds to a step 73. If the engine load value Q and the engine speed value N are outside of the first range, the program proceeds to a step 74.

Figure 6:
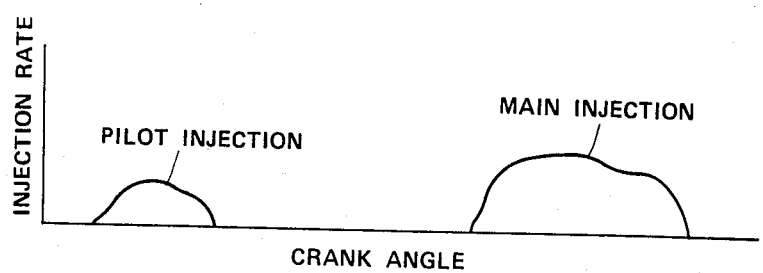
FIG. 6 is a diagram of the relationship between the fuel injection rate and the crank angle at small engine loads and low engine speeds.

In the step 73, the unit 60 sets the current of the control signal S3 to zero. As a result, the three-way valve 40 assumes its second limit position at which a full pilot fuel injection is performed prior to main fuel injection. In this case, the rate of fuel injection into an engine combustion chamber varies with crank angle as illustrated in FIG. 6. Accordingly, at low engine speeds and small engine loads, a full pilot fuel injection is performed to ensure quick ignition of the main charge of fuel. This prevents noisy combustion and detonation.

In the step 74, the unit 60 determines whether or not the engine load value Q and the engine speed value N are within a second range corresponding to high engine speeds and heavy engine loads. If the engine load value Q and the engine speed value N are within the second range, the program proceeds to a step 75. If the engine load value Q and the engine speed value N are outside of the second range, the program proceeds to a step 76.

Figure 8:
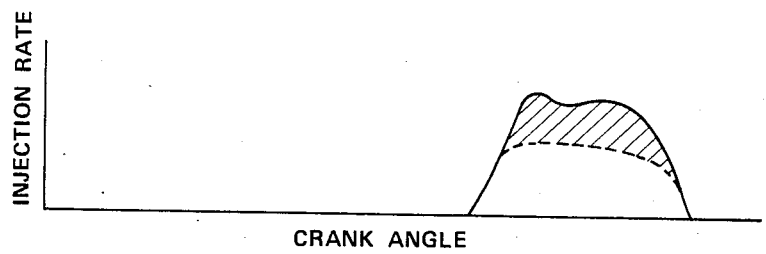
FIG. 8 is a diagram of the relationship between the fuel injection rate and the crank angle at heavy engine loads and high engine speeds.

In the step 75, the unit 60 sets the current of the control signal S3 to its maximum. As a result, the three-way valve 40 assumes its final limit position at which pilot fuel injection is completely interrupted and thus only main fuel injection is performed. Accordingly, at high engine speeds and heavy engine loads, only main fuel injection is performed as shown by FIG. 8. In this case, main fuel injection has two components one of which results from contraction of the first pressure chamber 27 and the other of which results from contraction of the second pressure chamber 28. Specifically, the main fuel injection quantity and rate is increased to the extent represented by the hatched area of FIG. 8 in comparison with the case of low engine speeds and small engine loads of FIG. 6. These increases of the main fuel injection quantity and rate are due to the addition of fuel from the second pressure chamber 28 into the main fuel injection. The interruption of pilot fuel injection and the increased main fuel injection rate ensure adequately high engine power output.

The step 76 is executed when the engine load value Q and the engine speed value N are outside of both of the first and second ranges, that is, when engine load and engine speed are at intermediate levels. In this step 76, the unit 60 determines a desired current level of the control signal S3 on the basis of the engine load value Q and the engine speed value N. In the flowchart, the desired current value is represented by a variable E. The ROM 63 holds a table in which a set of desired current values are plotted as a function of engine load and engine speed. Specifically, these desired current values range from zero to the maximum used in the step 75. As engine load increases, the desired current value increases. Similarly, as engine speed increases, the desired current value increases. The unit 60 determines the desired current value E by referring to that table. It should be noted that these desired current values correspond to desired values of the position of the three-way valve 40.

Figure 7:
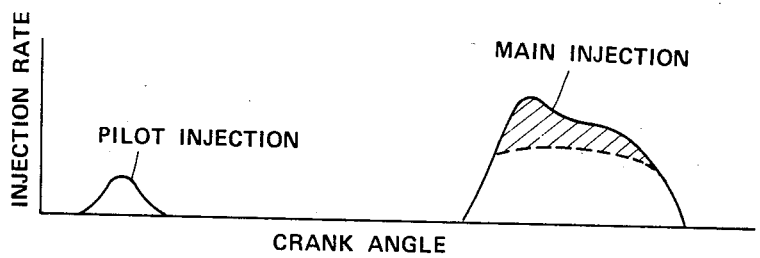
FIG. 7 is a diagram of the relationship between the fuel injection rate and the crank angle at partial engine loads and intermediate engine speeds.

After the step 76, the program advances to a step 77 in which the unit 60 sets the actual current level of the control signal S3 to the desired value E determined in the step 76. As a result, the three-way valve 40 assumes a position intermediate between the first and second limit positions at which a partial pilot fuel injection is performed prior to main fuel injection. In this case, the rate of fuel injection into an engine combustion chamber varies with crank angle as illustrated by FIG. 7. Accordingly, at intermediate engine speeds and moderate engine loads, partial pilot fuel injection is performed to ensure quick ignition of the main charge of fuel and so prevent noisy combustion and detonation. In this situation, the pilot fuel injection quantity and rate are lower than in the case of low engine speeds and small engine loads of FIG. 6. Furthermore, the main fuel injection quantity and rate are increased to the extent represented by the hatched area of FIG. 7 in comparison with the case of low engine speeds and small engine loads of FIG. 6. These increases in the main fuel injection quantity and rate are due to the addition of fuel from the second pressure chamber 28 into the main fuel injection. These increased main fuel injection quantity and rate serve to increase engine power output. As engine load and speed increased, the pilot fuel injection quantity and rate decrease but the main fuel injection quantity and rate increase.

After the steps 73, 75, and 77, the program returns to the first step 70. As a result, this sequence of steps is reiterated so that the current of the control signal S3 determining the position of the three-way valve 40 is updated in accordance with variations in the engine load and the engine speed.

Figure 9:
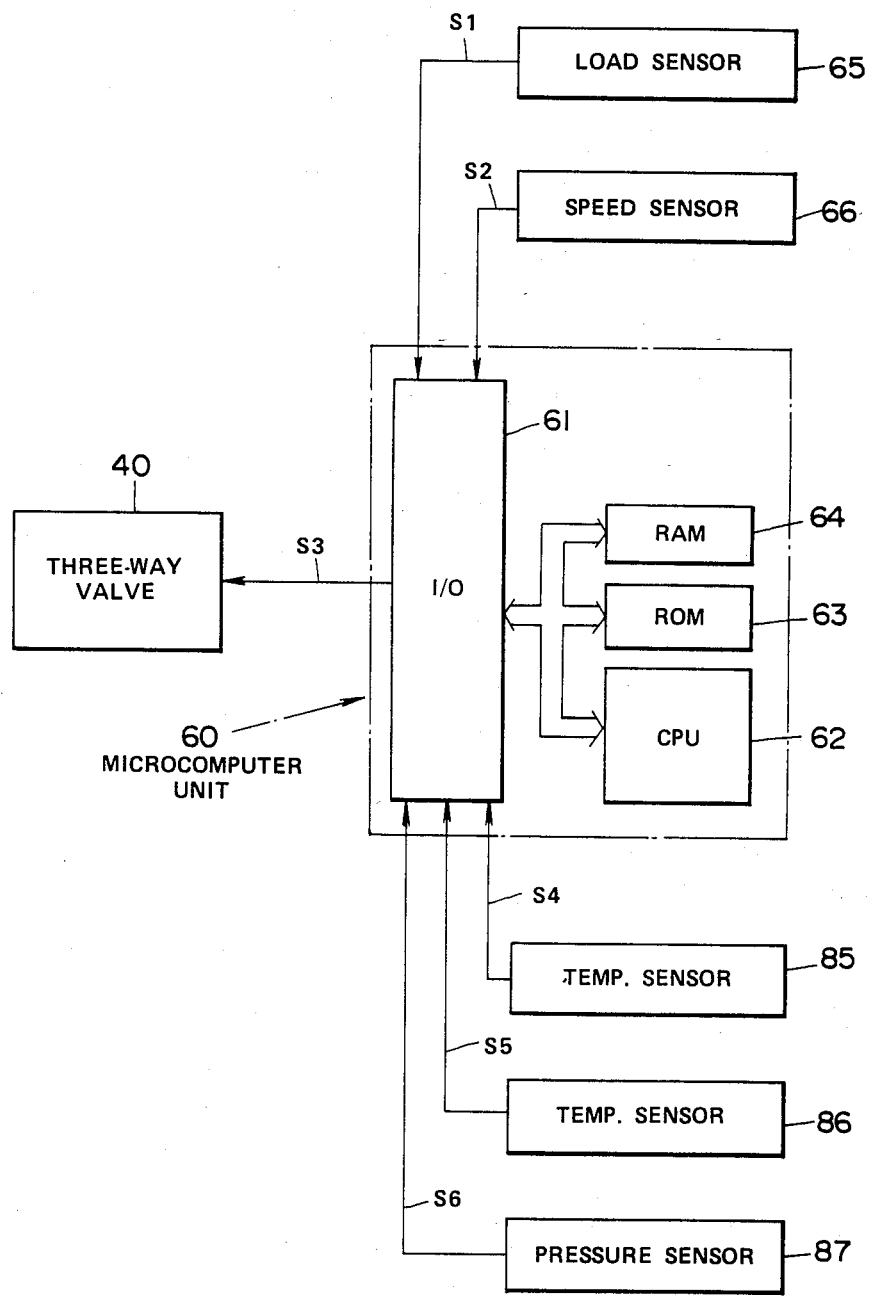
FIG. 9 is a block diagram of a second embodiment of this invention.

FIG. 9 shows a second embodiment of this invention, which is similar to the embodiment of FIGS. 2 to 4 except for the following additional features. A temperature sensor 85 monitors the temperature of coolant of the engine and generates a signl S4 indicative thereof. Another temperature sensor 86 monitors the temperature of ambient air and generates a signal S5 indicative thereof. A pressure sensor 87 monitors the pressure of ambient air and generates a signal S6 indicative thereof.

The I/O circuit 61 is connected to these sensors 85, 86, and 87 to receive the coolant temperature signal S4, the air temperature signal S5, and the air pressure signal S6. The microcomputer unit 60 corrects the current of the control signal S3 on the basis of the sensed values of the coolant temperature, the air temperature, and the air pressure.

Figure 10:
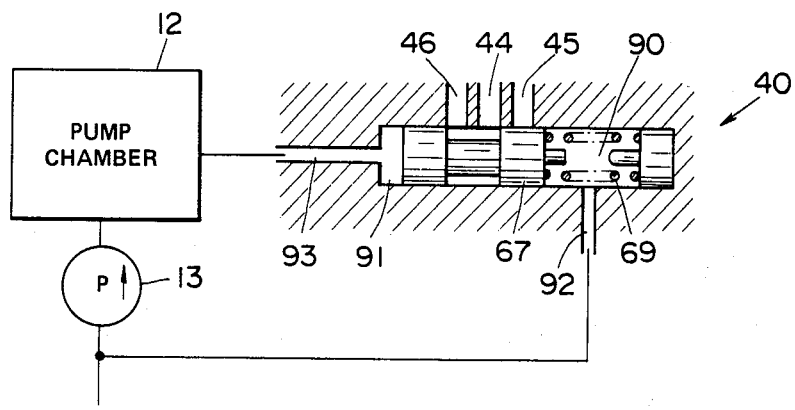
FIG. 10 is a diagram of a third embodiment of this invention.

FIG. 10 shows a third embodiment of this invention, which is similar to the embodiment of FIGS. 2 to 4 except for the following design changes. The solenoid is omitted from the three-way valve 40. Instead, the position of the valve spool 67 is controlled by a pressure differential dependent on engine speed.

One end of the valve spool 67 defines a primary chamber 90 in conjunction with the walls of the housing 11. The other end of the valve spool 67 defines a secondary chamber 91 in conjunction with the walls of the housing 11. The return spring 69 disposed in the primary chamber 90 urges the valve spool 67 toward the secondary chamber 91. The primary chamber 90 is connected to the inlet of the fuel feed pump 13 by a passage 92. The secondary chamber 91 is connected to the outlet of the fuel feed pump 31 via a passage 93 and the pump chamber 12. As a result, the pressure across the fuel feed pump 13 is applied across the valve spool 67. Thus, the position of the valve spool 67 depends on the pressure across the fuel feed pump 13.

The fuel feed pump 13 is driven by the engine so that the pressure across the fuel feed pump 13 increases with engine speed. Therefore, the position of the valve spool 67 depends on engine speed. At low engine speeds, full pilot fuel injection is performed. As the engine speed increases, the degree of the pilot fuel injection drops. At high engine speeds, pilot fuel injection is completely suspended.

In place of a pressure dependent on engine speed, a pressure dependent on engine load may be applied across the valve spool 67. In this case, an appropriate device, such as a load timer (disclosed in Japanese Pat. No 57-49750), is used to produce the load-dependent pressure. The position of the valve spool 67 thus depends on the engine load.

Figure 11:
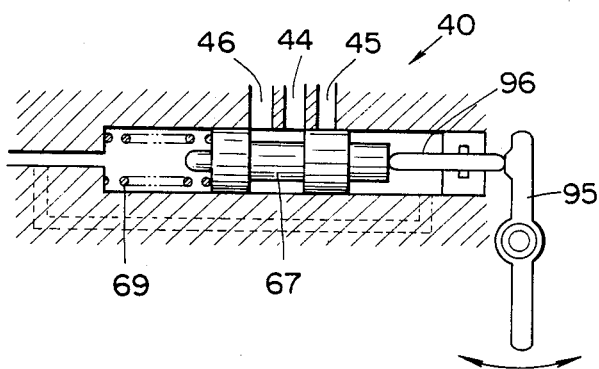
FIG. 11 is a diagram of a fourth embodiment of this invention.

FIG. 11 shows a fourth embodiment of this invention, which is similar to the embodiment of FIGS. 2 to 4 except for the following design changes. The solenoid is omitted from the three-way valve 40, and instead the position of the valve spool 67 is mechanically controlled in accordance to the engine load.

A control lever 95 disposed in the linkage between the control sleeve 80 (see FIG. 1) and the accelerator lever engages one end of the valve spool 67 via a movable rod 96. The return spring 69 engages the other end of the valve spool 67. As the control lever 95 pivots, the valve spool 67 moves.

Since the angular position of the control lever 95 depends on the engine load, the position of the valve spool 67 also depends on the engine load. At small engine loads, full pilot fuel injection is performed. As the engine load increases, the degree of pilot fuel injection drops. At heavy engine loads, pilot fuel injection is completely suspended.

A cam mechanism may be disposed in the connection between the control lever 95 and the valve spool 67 in order that the relationship between the engine load and the position of the valve spool 67 can be adjusted by choice of the profile of the cam.

Figure 12:
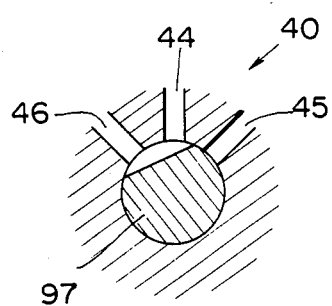
FIG. 12 is a cross-sectional view of another example of the three-way valve used in the first embodiment of this invention.

FIG. 12 shows another example of the three-way valve 40. This valve 40 has a rotary valve member 97 and a stepping motor (not shown) with a rotatable drive shaft connected to the valve member 97. This valve 40 controllably connects the inlet 41 to the first and second outlets 42 and 43. The microcomputer unit 60 (see FIG. 2) supplies the control signal S3 to the stepping motor for positional control of the three-way valve 40.

Figure 13:
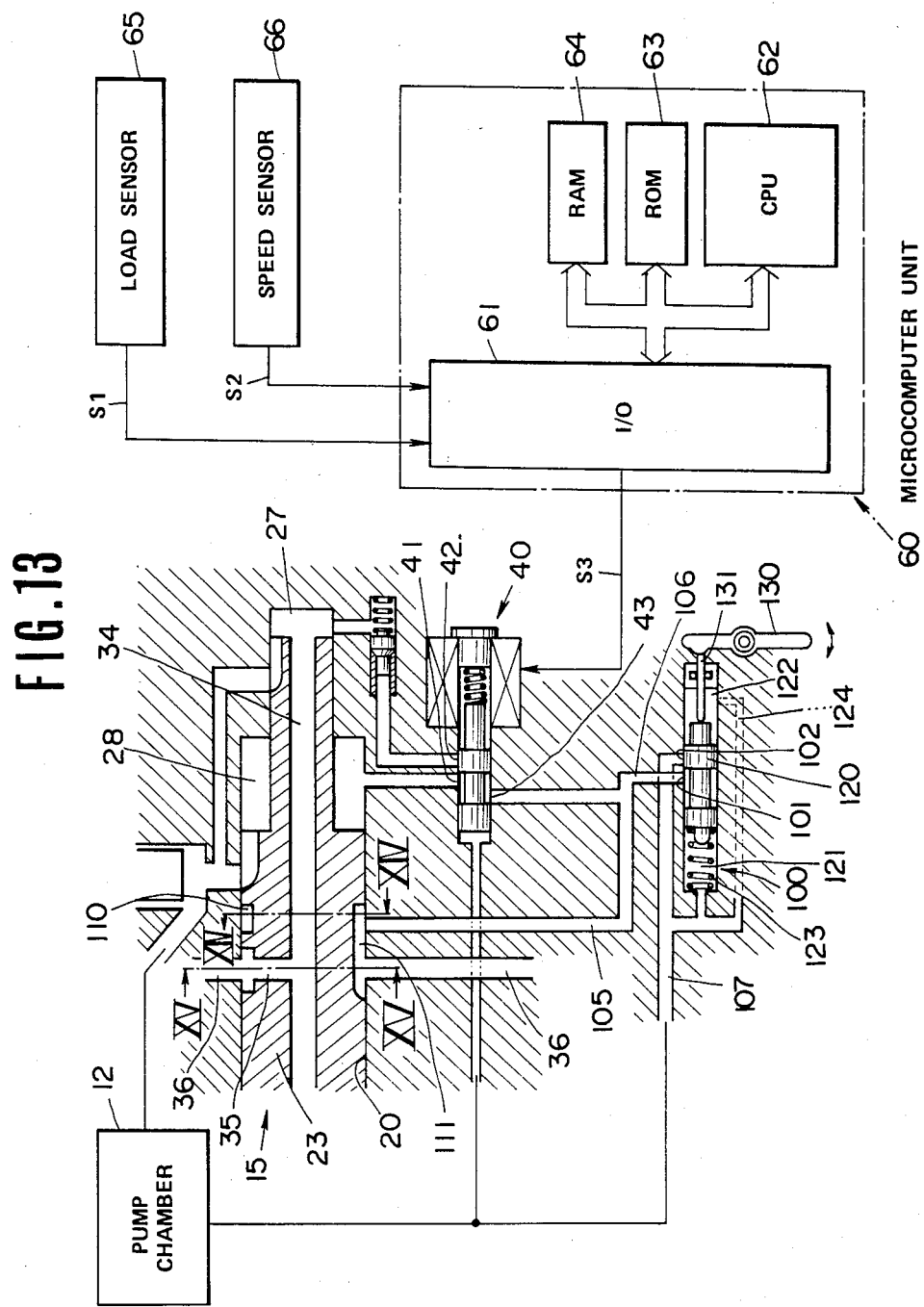
FIG. 13 is a diagram of a fifth embodiment of this invention.

FIG. 13 shows a fifth embodiment of this invention, which is similar to the embodiment of FIGS. 2 to 4 except for the following additional features and design changes. Another spool valve 100 includes an inlet 101 and an outlet 102. This valve 100 is movable between fully-closed and open positions. When the valve 100 assumes its fully-closed position, the inlet 101 is completely disconnected from the outlet 102. When the valve 100 assumes its fully-open position, the inlet 101 and the outlet 102 are fully connected to each other. As the valve 100 moves from its full-closed position to its fully-open position, the degree of the communication between the inlet 101 and the outlet 102 increases.

A pilot passage 105 connects the second outlet 43 of the three-way valve 40 and the large bore 20. A first relief passage 106 connects the pilot passage 105 and the inlet 101 of the valve 100. A second relief passage 107 connects the outlet 102 of the valve 100 and the pump chamber 12.

Figure 14:
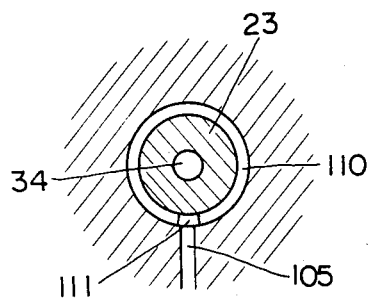
FIG. 14 is a cross-sectional view taken along the line XIV—XIV of FIG. 13.
Figure 15:
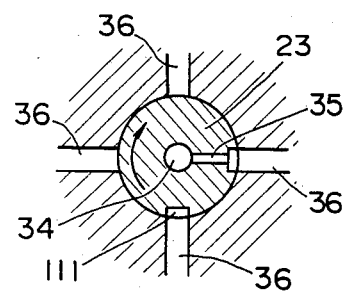
FIG. 15 is a cross-sectional view taken along the line XV—XV of FIG. 13.

As shown in FIGS. 13 and 14, the large-diameter portion 23 of plunger 15 has a circumferentially-extending annular groove 110 into which the end of the pilot passage 105 opens. The communication between the annular groove 110 and the pilot passage 105 is maintained independent of the position of the plunger 15. As shown in FIGS. 13 to 15, the large-diameter portion 23 of plunger 15 has an axial groove 111 extending from the annular groove 110. The axial groove 111 remains in communication with the pilot passage 105 via the annular groove 110 independent of the position of the plunger 15. As the plunger 15 rotates, the axial groove 111 moves into and out of register or communication with each of the fuel discharge passages 36 sequentially or in turn. As the plunger 15 moves through its compression stroke, the communication between the axial groove 111 and one of the fuel discharge passage 36 is maintained. As shown in FIG. 15, the angular position of the axial groove 111 precedes the angular position of the radial passage 35 by the same angular interval as between the fuel discharge passage 36 as viewed in the direction of rotation of the plunger 15 indicated by the arrow. Therefore, when the radial passage 35 communicates with one of the fuel discharge passages 36, the axial groove 111 communicates with the preceding fuel discharge passage.

In the case where the three-way valve 40 establishes communication between the inlet 41 and the second outlet 43, when the valve 100 is in its fully-closed position, all of the fuel driven out of the second pressure chamber 28 into the pilot passage 105 via the first fuel supply passage 44 and the valve 40 enters one of the fuel discharge passages 36 via the three-way valve 40, the pilot passage 105, the annular groove 110, and the axial groove 111 during fuel injection stroke. This fuel is injected into an engine combustion chamber, effecting pilot fuel injection.

In the same case, when the valve 100 is in a position between its fully-closed and open positions, a first portion of the fuel driven out of the second pressure chamber 28 into the pilot passage 105 enters one of the fuel discharge passages 36 and the remainder of the fuel returns to the pump chamber 12 via the three-way valve 40, the pilot passage 105, the first relief passage 106, the valve 40, and the second relief passage 107 during the fuel injection stroke. The first portion of the fuel provides pilot fuel injection. The remainder of the fuel provides pressure relief or escape from pilot fuel injection. As the valve 100 moves from its fully-closed position to its fully-open position, fuel relief rate and quantity increase while pilot fuel injection rate and quantity decrease.

In the same case, when the valve 100 is in its fully open position, all of the fuel driven out of the second pressure chamber 28 into the pilot passage 105 returns to the pump chamber 12 during the fuel injection stroke. As a result, pilot fuel injection is completely suspended.

Pilot fuel injection rate and quantity are adjusted as a function of the position of the valve 100. This adjustment of pilot fuel injection rate and quantity is substantially independent of main fuel injection.

The valve 100 includes a valve spool 120 slidably disposed within a bore defined by the walls of the housing 11. One end of the valve spool 120 defines a first chamber 121. The other end of the valve spool 120 defines a second chamber 122. A return spring 123 disposed within the first chamber 121 urges the valve spool 120 toward the second chamber 122. A passage 124 connects the first chamber 121 and the second relief passage 107. Another passage 125 connects the second chamber 122 and the second relief passage 107. Accordingly, no pressure diffrence is exerted across the valve spool 120. This ensures smooth and accurate movement of the valve spool 120.

As shown in FIG. 13, a control lever 130 disposed in the linkage between the control sleeve 80 (see FIG. 1) and the accelerator lever engages one end of a rod 131 extending movably into the second chamber 122. The other end of the rod 131 engages the end of the valve spool 120. As the control lever 130 pivots counterclockwise as viewed in FIG. 13, the valve spool 120 moves against the force of the return spring 123. As the control lever 130 reverses, the valve spool 120 is returned by the force of the spring 123. Since the angular position of the control lever 130 depends on the engine load, the position of the valve spool 120, that is, the position of the valve 100 depends on the engine load. Accordingly, pilot fuel injection rate and quantity are adjusted as a function of the engine load via the valve 100. Specifically, pilot fuel injection rate and quantity decrease as the engine load increases.

The valve 100 may be controlled by the microcomputer unit 60. In this case, the valve 100 should include a solenoid for driving the valve spool 120. The microcomputer unit 60 supplies a signal to the solenoid for positional control of the valve 100 on the basis of the engine load and/or speed.

FIG. 16 shows a sixth embodiment of this invention, which is similar to the embodiment of FIGS. 13 to 15 except for the following additional features and design changes. The valve 100, the relief passages 106 and 107 are omitted from this embodiment.

The position of the fuel cut-off valve 84 is changed so that this valve 84 can selectively block and open the first fuel intake passage 29 at a point downstream of the connection with the second fuel intake passage 31. An electromagnetic valve 140 selectively blocks and opens the second fuel intake passage 31.

The microcomputer unit 60 generates a constant-frequency pulse signal S10, the duty cycle of which varies as a function of the sensed engine load and speed. The valve 140 is electrically connected to the I/O circuit 61 to receive the pulse signal S10. The time-averaged degree of opening of the valve 140 depends on the duty cycle of the pulse signal S10. As the degree of opening of the valve 140 increases, the rate and quantity of intake fuel into the second pressure chamber 28 increases. In the case where the three-way valve 40 is in a position at which pilot fuel injection is enabled, increases in the rate of quantity and intake fuel into the second pressure chamber 28 result in increases in the pilot fuel injection rate and quantity. In the case where the three-way valve 40 is in a position at which part of the fuel driven out of the second pressure chamber 28 is included in the main fuel injection, increases in the rate and quantity of intake fuel into the second pressure chamber 28 result in increases in the main fuel injection rate and quantity. Thus, the pilot fuel injection rate and quantity as well as the main fuel injection rate and quantity are adjusted via the valve 140 as a function of the engine load and speed.

Figure 17:
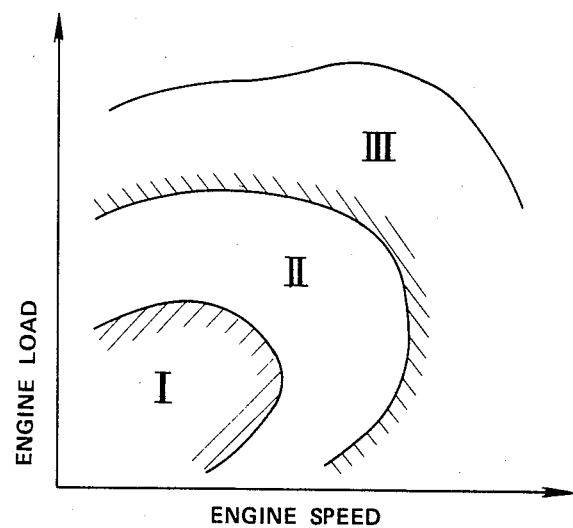
FIG. 17 is a diagram of three ranges defined by the engine load and speed in which three different types of fuel injection rate control are performed respectively.

The microcomputer unit 60 controls the rate and quantity of main and pilot fuel injections via the valves 40 and 140 in response to the engine load and speed. Specifically, in a small engine load and low engine speed range denoted by the character I in FIG. 17, full pilot fuel injection is performed. In a heavy engine load and high engine speed range denoted by the character III in FIG. 17, pilot fuel injection is completely suspended. In a moderate engine load and engine speed range denoted by the character II in FIG. 17, pilot fuel injection is partially enabled. In this range, as the engine load and speed increase, the pilot fuel injection rate and quantity decrease relative to the main fuel injection rate and quantity.

What is claimed is:

1. A fuel injection control system for an internal combustion engine having a crankshaft and a combustion chamber, comprising:
   (a) first means for periodically injecting fuel into the combustion chamber at a first timing within an engine cycle with respect to rotation of the crankshaft; and
   (b) second means for periodically injecting fuel into the combustion chamber at the first timing and also at a second timing within said engine cycle with respect to rotation of the crankshaft, the second timing preceding the first timing, the rate and quantity of fuel injection by the second means at the first timing being dependently and inversely related to the rate and quantity of fuel injection by the second means at the second timing.

2. The system of claim 1, including dependently operated valve means for controlling the rate of fuel injection by the second means at the first timing to increase from zero to its maximum and to decrease from its maximum to zero as the rate and quantity of fuel injection by the second means at the second timing decreases from its maximum to zero and increases from zero to its maximum, respectively.

3. The system of claim 1, further comprising:
   (a) means for sensing the load on the engine; and
   (b) means for increasing the rate and quantity of fuel injection by the second means at the first timing and thus decreasing the rate of fuel injection by the second means at the second timing as the sensed engine load increases.

4. The system of claim 1, further comprising:
   (a) means for sensing the speed of rotation of the crankshaft; and
   (b) means for increasing the rate and quantity of fuel injection by the second means at the first timing and thus decreasing the rate and quantity of fuel injection by the second means at the second timing as the sensed crankshaft speed increases.

5. A fuel injection control system for an internal combustion engine having a rotatable crankshaft and at least two combustion chambers operating at the same frequency and at different phases with respect to each other, the system comprising:
   (a) a plunger free to reciprocate;
   (b) means for reciprocating the plunger as the crankshaft rotates;
   (c) a member defining a first pressure chamber in conjunction with the plunger, the first pressure chamber contracting and expanding as the plunger reciprocates;
   (d) means for conducting fuel to the first pressure chamber as the first pressure chamber expands;
   (e) means for conducting fuel from the first pressure chamber to each of the combustion chambers in turn to effect first fuel injection thereinto each time the first pressure chamber contracts;
   (f) a member defining a second pressure chamber in conjunction with the plunger, the second pressure chamber contracting and expanding as the plunger reciprocates;
   (g) means for conducting fuel to the second pressure chamber as the second pressure chamber expands;
   (h) means for conducting fuel out of the second pressure chamber as the second pressure chamber contracts;
   (i) means for dividing fuel from the second pressure chamber into first and second portions;
   (j) means for conducting the first portion of fuel to the first pressure chamber; and
   (k) means for conducting the second portion of fuel to each of the combustion chambers in turn to effect second fuel injection thereinto, the combustion chamber which is receiving the second fuel injection operating prior to the combustion chamber which is receiving the first fuel injection.

6. The system of claim 5, further comprising:
   (a) means for sensing the load on the engine; and
   (b) means for increasing the first portion of fuel and thus decreasing the second portion of fuel as the sensed engine load increases.

7. The system of claim 5, further comprising:
   (a) means for sensing the speed of rotation of the crankshaft; and
   (b) means for increasing the first portion of fuel and thus decreasing the second portion of fuel as the sensed crankshaft speed increases.

8. The system of claim 5, further comprising means for disabling delivery of part of the second portion of fuel to the combustion chamber.

9. The system of claim 8, further comprising:
   (a) means for sensing the load on the engine; and
   (b) means for increasing the disabled part of the second portion of fuel as the sensed engine load increases.

10. The system of claim 5, further comprising means for adjusting the rate and quantity of fuel delivery to the second pressure chamber.

11. The system of claim 10, further comprising:
    (a) means for sensing the load on the engine; and
    (b) means for increasing the rate and quantity of fuel delivery to the second pressure chamber as the sensed engine load decreases.

12. The system of claim 10, further comprising:
    (a) means for sensing the speed of rotation of the crankshaft; and
    (b) means for increasing the rate and quantity of fuel delivery to the second pressure chamber as the sensed crankshaft speed decreases.

* * * * *